(12) United States Patent
Andreoli et al.

(10) Patent No.: US 9,139,376 B2
(45) Date of Patent: Sep. 22, 2015

(54) MONITORING SYSTEM FOR MEASURING SPEED AND ELONGATION OF TRANSPORT CHAINS

(71) Applicants: Andrea Andreoli, Modena (IT); Fabio Salice, Cantu' (IT)

(72) Inventors: Andrea Andreoli, Modena (IT); Fabio Salice, Cantu' (IT)

(73) Assignee: REXNORD FLATTOP EUROPE S.R.L., Correggio (RE) (IT)

( * ) Notice: Subject to any disclaimer, the term of this patent is extended or adjusted under 35 U.S.C. 154(b) by 0 days.

(21) Appl. No.: 14/375,310

(22) PCT Filed: Jan. 30, 2013

(86) PCT No.: PCT/EP2013/051817
§ 371 (c)(1),
(2) Date: Jul. 29, 2014

(87) PCT Pub. No.: WO2013/113764
PCT Pub. Date: Aug. 8, 2013

(65) Prior Publication Data
US 2015/0008097 A1    Jan. 8, 2015

(30) Foreign Application Priority Data
Jan. 31, 2012 (IT) .............. MI2012A0120

(51) Int. Cl.
*B65G 43/00* (2006.01)
*B65G 43/02* (2006.01)
*G01M 13/02* (2006.01)
*G01B 7/04* (2006.01)
(Continued)

(52) U.S. Cl.
CPC ............. *B65G 43/02* (2013.01); *B65G 43/04* (2013.01); *G01B 7/046* (2013.01); *G01L 5/04* (2013.01); *G01M 13/02* (2013.01)

(58) Field of Classification Search
CPC ................................ B65G 43/00; B65G 43/02
USPC ........ 198/502.1, 810.01, 810.02; 73/862.392, 73/159; 324/206
See application file for complete search history.

(56) References Cited

U.S. PATENT DOCUMENTS 2,989,690 A * 6/1961 Cook ............................ 324/206
4,409,852 A   10/1983 Suzuki et al.
4,464,654 A * 8/1984 Klein ....................... 198/810.02
(Continued)

FOREIGN PATENT DOCUMENTS

| CN | 1835881 A | 9/2006 |
| CN | 104204753 A | 12/2014 |
| GB | 2 406 844 A | 4/2005 |

OTHER PUBLICATIONS

International Search Report under date of mailing of Mar. 20, 2013 in connection with PCT/EP2013/051817.
(Continued)

*Primary Examiner* — James R Bidwell
(74) *Attorney, Agent, or Firm* — Quarles & Brady LLP

(57) ABSTRACT

A monitoring system for a conveyor of articles includes a reference element located on a transport chain and sensors. Each sensor senses passage of the reference element during the operation of the conveyor. Counting means measures time elapsed between passage of the reference element close to the sensors. Computing means determines transport chain movement speed with respect to the static portion based on the first measured time and the first distance, and determines the length of the chain based on the determined movement speed and based on the second measured time.

10 Claims, 5 Drawing Sheets

(51) Int. Cl.
*G01L 5/04* (2006.01)
*B65G 43/04* (2006.01)

(56) References Cited

U.S. PATENT DOCUMENTS

| | | | |
|---|---|---|---|
| 5,563,392 A | 10/1996 | Brown et al. | |
| 6,291,991 B1 * | 9/2001 | Schnell | 324/235 |
| 7,827,914 B2 * | 11/2010 | Fernandez et al. | 101/485 |
| 2004/0226805 A1 | 11/2004 | Lodge | |
| 2008/0308391 A1 * | 12/2008 | May | 198/810.02 |

OTHER PUBLICATIONS

The State Intellectual Property Office of the People's Republic of China, First Office Action and Search Report, Application No. 201380018166X, Jun. 17, 2015, 7 pages [English Language Translation Only].

* cited by examiner

MONITORING SYSTEM FOR MEASURING SPEED AND ELONGATION OF TRANSPORT CHAINS

CROSS-REFERENCE TO RELATED APPLICATIONS

This application represents the national stage entry of PCT International Application No. PCT/EP2013/051817 filed Jan. 30, 2013, which claims the benefit of Italian Patent Application No. MI2012A000120 filed Jan. 31, 2012, the disclosures of which are hereby incorporated by reference in their entirety for all purposes.

STATEMENT REGARDING FEDERALLY SPONSORED RESEARCH OR DEVELOPMENT

Not applicable.

FIELD OF THE INVENTION

The present invention generally relates to the field of conveyors of articles: more specifically the invention concerns a monitoring system for measuring the elongation of the transport chains of such conveyors.

BACKGROUND OF THE INVENTION

Conveyors of articles, and in particular belt, carpet, or chain conveyors, are used in many industrial or civilian fields, from food industry to airports. In very general terms, a conveyor comprises one or more transport elements, adapted to provide a support surface for the products to be transported, which are made to advance along a conveying path by suitable moving means such as electric motors, pinions and driving gears. In particular, carpet or belt conveyors use as transport means a chain consisting of several segments formed by a plurality of links, hinged together by means of respective pins to form a support surface substantially flat, smooth, destined to the support of the articles to by carried.

Like all mechanical systems, also transporters and their components are subject to wear during their operation. For example, the pins that hinge the links of the chain segments may wear off when subjected to prolonged efforts. In plastic chains with steel pin, the seat of the pin wears more than the pin itself, while in chains entirely made of steel or entirely made of plastic, wear is present in similar proportions both on the pin and on the hinge seat of the pin. In any case, due to wear, the links that make up the chain segments may tend to open up and move away one from the other, with the result that the surface of the transport element no longer provides the necessary carrying capacity. The separation of the links caused by wear causes a consequent progressive elongation of the chain, which, if excessive, may adversely affect the correct coupling of the chain with the pinions. Indeed, when the elongation becomes excessive, the chain links, at the time of coupling with the teeth of the pinion, tend to move to the tip of the teeth rather than near the bottom of the space between two successive teeth.

The progressive separation of the chain links from the bottom of the space between successive teeth of the pinion is such as to cause a gradual variation of the chain movement speed. If the elongation of the chain due to the opening of the links exceed a certain critical threshold, such as for example 3% of the initial length, the chain may skip a tooth of the pinion, causing the chain to be subjected to very high dynamic stresses, and therefore determining more or less frequent halts in the flow of transported articles, and consequent falls of the same from the transport chain.

For this reason, the conveyors require periodic inspections by qualified operators in order to control the actual amount of elongation of the chain and, where necessary, proceed to plan the plant stoppage and the repair or replacement of the chain. However, given the considerable costs associated with the traditional monitoring, it is preferable to implement a system capable of automatically monitoring the elongation of the chains of the conveyor. For example, each chain may be provided with a proper smart measuring device capable of measuring the elongation of the chain and to report in real time when such elongation has exceeded a predetermined critical threshold. However, implementing an automatic monitoring system of this type proves to be very complex, for the following reasons.

First, since the effective size to be detected is a relatively small quantity (the critical threshold is of the order of 3%), the measuring device should be sufficiently precise. Moreover, the majority of the measuring devices of this type currently widespread in the market are very complex, as adapted to detect the magnitude (elongation) by means of a local measurement. Then, taking into account the fact that in a single site (for example, a factory) there may be a large number of conveyors, each comprising a plurality of chains, and that each chain may be subject to elongation independently from the others, the number of measuring devices of the automatic monitoring system may easily rise until reaching a high value. Finally, the measuring devices must necessarily be robust in order to correctly operate even in the adverse conditions that may occur in a hostile work environment like an industrial plant, such as for example the presence of electrical machinery in the vicinity of the conveyors that may generate not negligible electromagnetic interference, high temperatures, excessive humidity, presence of dust, vibrations, and aggressive cleaning chemicals.

SUMMARY OF THE INVENTION

The Applicant has therefore addressed the problem of how to obtain a system for monitoring conveyors for the detection of chains elongation that is not affected by the drawbacks mentioned above.

One aspect of a solution in accordance with an embodiment of the invention proposes a monitor system for a conveyor of articles. The conveyor of articles comprises a static portion and at least one respective endless transport chain adapted to be moved with respect to the static portion when the conveyor of articles is in operation. The system includes a reference element located on the transport chain, a first sensor integral with the static portion and a second sensor integral with the static portion. Said first and second sensors are distant to each other by a first distance: each sensor is configured to sense the passage of the reference element close to the sensor itself during the operation of the conveyor. The system further includes counting means coupled with the sensors and configured to measure a first time corresponding to the time elapsed between a first passage of the reference element close to the first sensor and a first passage of the reference element close to the second sensor. The counting means are further configured to measure a second time corresponding to the time elapsed between the first passage of the reference element close to the first sensor and a second passage of the reference element close to the first sensor, or to the time elapsed between the first passage of the reference element close to the second sensor and a second passage of the reference element close to the second sensor. Said second passage is subsequent to the first passage. The system further comprises computing means configured to determine the transport chain movement speed with respect to the static portion based on the first measured time and the first distance, and determine the length of the chain based on the determined movement speed and based on the second measured time.

According to an embodiment of the present invention, the transport chain comprises a plurality of chain links; said reference element is a single reference element located on a chain element. Said counting means are further configured to memorize a first group of first measured times; said first group comprises a series of first times most recently measured by said counting means. Said computing means further comprises a processing unit configured to determine for each first measured time of the first group a corresponding value of the transport chain movement speed by dividing the first distance by said first measured time.

According to an embodiment of the present invention, said counting means are further configured to memorize a second group of second measured times. Said second group comprises a series of second times most recently measured by said counting means. Said processing unit is further configured to determine for each second measured time of the second group a corresponding value of chain length by multiplying said second measured time with a corresponding determined value of the transport chain movement speed.

Preferably, the processing unit is further configured to determine a chain length average value by summing to each other the values of the transport chain movement speed determined based on the second measured times of the second group and by dividing such sum by the number of second measured times of the second group.

According to an embodiment of the present invention, said computing means are configured to determine a transport chain movement speed instantaneous value by dividing the first distance by the first measured time, and a transport chain length instantaneous value by multiplying said determined transport chain movement speed instantaneous value by the second measured time.

Advantageously, the computing means are remote with respect to the counting means; said system further comprises an interfacing unit in communication relationship with the counting means and the computing means.

According to an embodiment of the present invention, the interfacing unit is adapted to interrogate the counting means for receiving the first measured times and the second measured times calculated by the counting means; the computing means are adapted to interrogate said interfacing unit for receiving the first measured times and the second measured times received from the interfacing unit.

According to an embodiment of the present invention, said sensors are configured to detect a physical quantity, and said reference element is configured to generate, in the space surrounding it, anomalies such to altering the value of the physical quantity detectable by the sensors.

According to an embodiment of the present invention, said sensors are Hall sensors, and said reference element is a magnet.

A solution in accordance with one or more embodiments of the invention, as well as further features and advantages thereof, will be best understood by reference to the following detailed description, given purely by way of indicative and non limitative example, to be read in conjunction with the accompanying drawings (in which corresponding elements are indicated with the same or similar references and their explanation is not repeated for brevity). In this respect, it is expressly understood that the figures are not necessarily to scale (with some details that may be exaggerated and/or simplified) and that, unless otherwise indicated, they are merely used to conceptually illustrate the described structures and procedures.

DETAILED DESCRIPTION OF THE EXAMPLE EMBODIMENTS

Figure 1A:
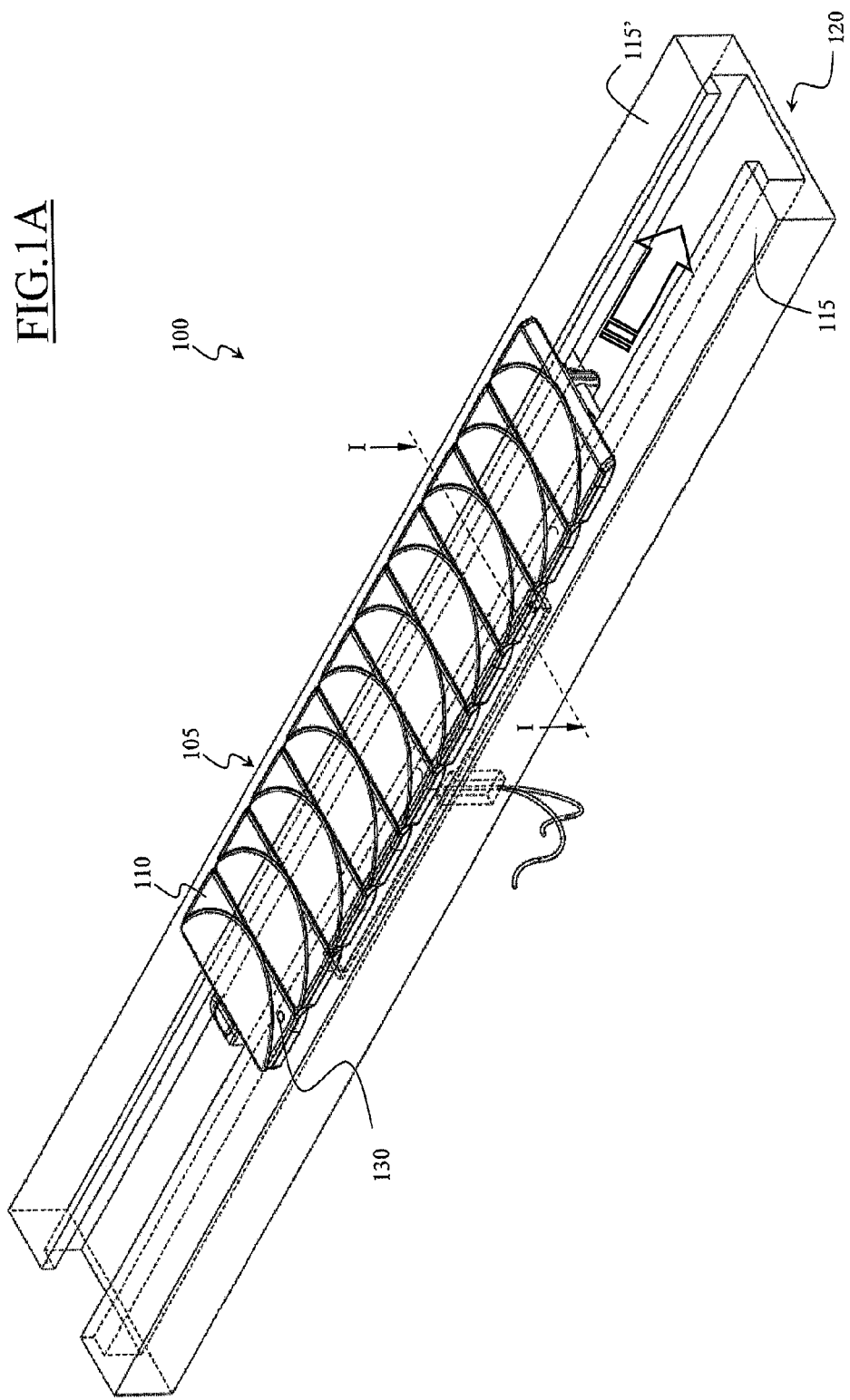
FIG. 1A schematically represents a short section of a conveyor of articles.

Referring in particular to the figures. FIG. 1A schematically represents a short section of a conveyor of articles 100, particularly a chain conveyor, comprising for example a conveyor chain 105 for the transport of articles such as, for example, beverage bottles (mineral water, soft drinks and the like), not shown in the figure. It is stressed that the type of conveyor, and the nature of the articles which it is intended to transport, are not limiting for the purposes of the present invention, which applies in general to any type of conveyor, irrespective of the nature of the articles to be transported.

The chain 105 is constituted by a plurality of chain segments, each of which is in turn constituted by a plurality of chain links 110 hinged to one another by means of pins (not shown) to define a substantially fat, smooth surface, for supporting products to be transported. The transport chain 105 is driven in motion by suitable driving means (not shown as known per se and not relevant to the understanding of the embodiment of the invention herein considered), and in use it is supposed to slide along the direction of the arrow shown in the figure. The chain 105 is an endless chain that forms a closed loop, comprising a forward portion adapted to provide the support surface for the products to be transported and a return portion. During the conveyor 100 operation, each link 110 of the chain 105 is then able to travel along a closed path, henceforth referred to with the term "circuit chain".

In the forward portion, the chain 105 slidably leans on, in correspondence of its outer edges, respective guide profiles 115, 115', made of a material with a low friction coefficient, mounted on shoulders of a support element 120.

In general terms, the monitoring system in accordance with one embodiment of the present invention provides that at least one detector apparatus is associated to each chain to be monitored, comprising a pair of proximity sensors adapted to detect the passage of a reference element located on the chain. Exploiting the proximity sensors, each detector apparatus is able to measure the time taken by the reference element to accomplish a predefined stretch path, and send that time to a processing unit which, on the basis of the measured time, is able to determine the movement speed of the chain. The chain movement speed so measured is then exploited by the processing unit to determine the actual length of the chain based on the time taken by the reference element to travel one complete revolution of the chain circuit. This circuit travel time is determined by the apparatus by measuring the time elapsing between two consecutive passages of the reference element at a same proximity sensor.

In accordance with a preferred embodiment of the present invention, the proximity sensors are magnetic proximity sensors, such as Hall sensors, and the reference element is a magnet.

In particular, in accordance with an embodiment of the present invention, the detector apparatus of the chain 105 comprises a magnet 130 located on (for example, encased in) a link 110, and a pair of Hall sensors (not visible in FIG. 1A), for example located in a portion of the conveyor 100 just below the chain 105 in such a way that the path traveled by the magnet 130 during the movement of the chain 105 passes right above the Hall effect sensors. Without going into details well known to experts in the field, a Hall sensor is an electronic device that allows the measurement of the magnetic field intensity exploiting the Hall effect.

Figure 1B:
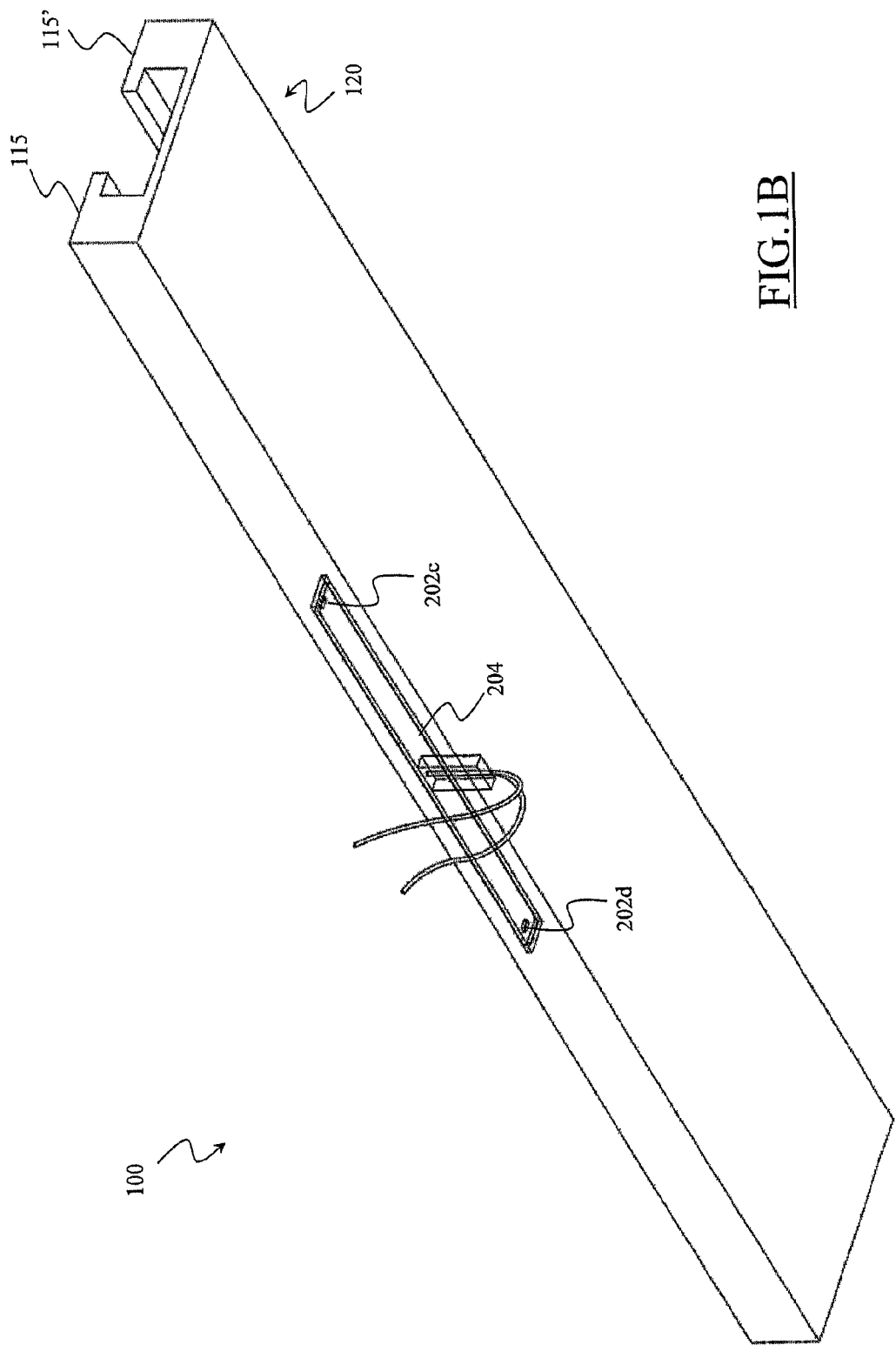
FIG. 1B is a cross-section of a support element of the chain of FIG. 1A.
Figure 1C:
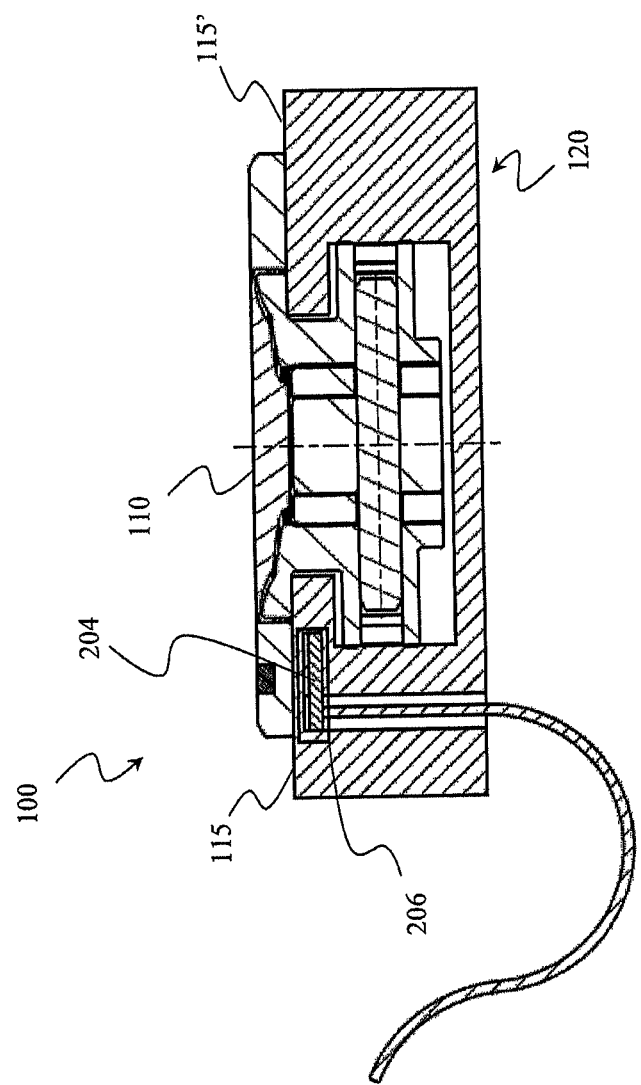
FIG. 1C is a sectional view of the conveyor of FIG. 1A.

FIG. 1B is a cross-section of the support element 120 in which it is visible the position of the Hall sensors in accordance with an embodiment of the invention, while FIG. 1C is a sectional view (along the line II of FIG. 1A) of the conveyor 100. In accordance with this embodiment, a first Hall sensor 202c and a second Fall sensor 202d are installed on a printed circuit board 204 in a localized portion of the support member 120 located below the guide profile 115. For example, as shown in FIG. 1C, the board 204 may be installed in a cavity 206 formed in the support element 120 itself.

Figure 2:
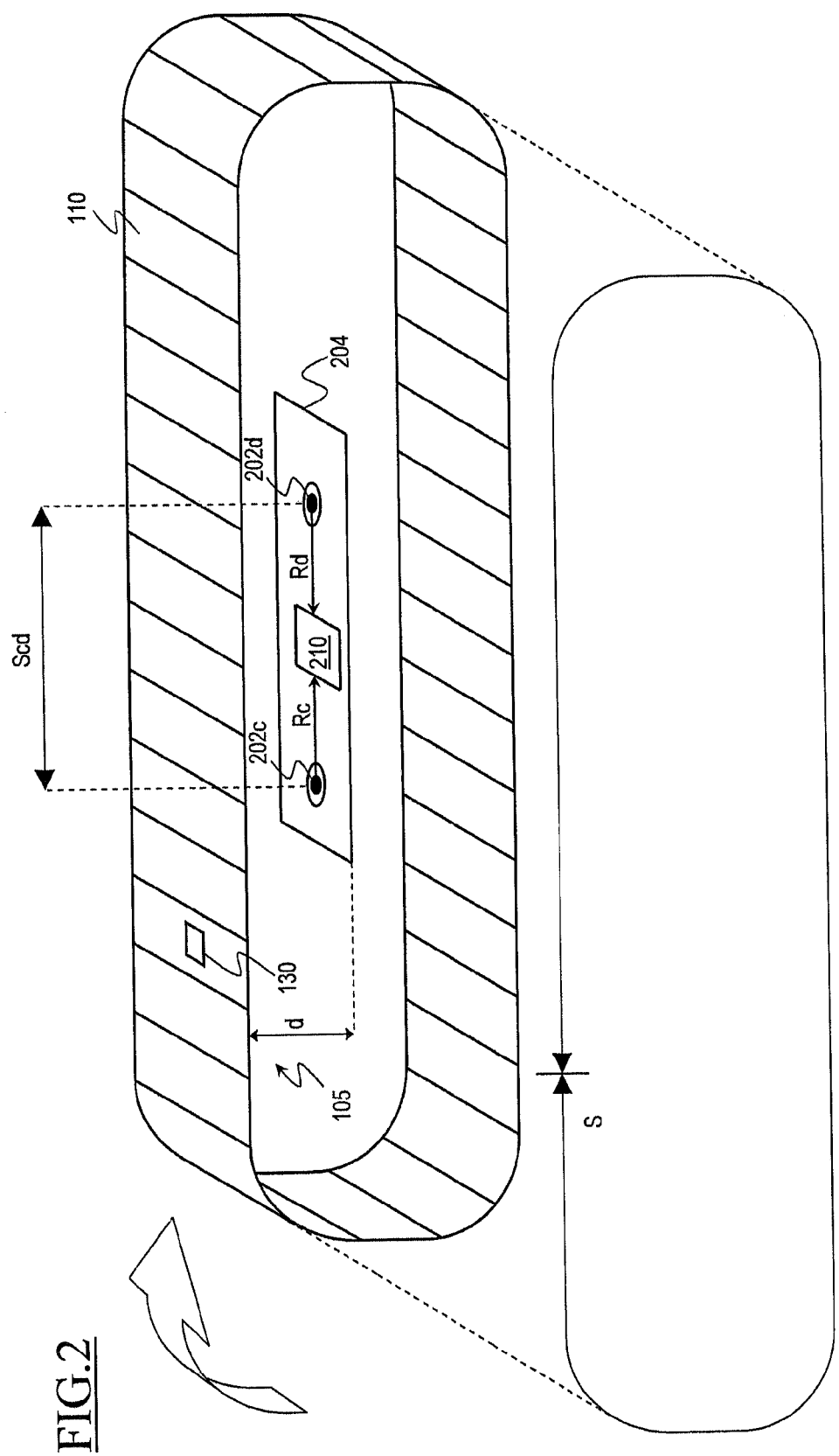
FIG. 2 is a simplified view with partially removed parts of the conveyor of FIG. 1A in which a detector apparatus is visible in accordance with one embodiment of the present invention, and FIG. 3 schematically illustrates a monitoring system in accordance with one embodiment of the present invention.

A simplified view with partially removed parts of the conveyor 100 wherein the detector apparatus of the chain 105 is visible in accordance with an embodiment of the present invention is schematically illustrated in FIG. 2.

The magnet 130, located on a link 110 of the chain 105, in order to perform a complete revolution of the chain circuit has to travel a distance S that, starting from a known initial value, with the passage of time tends to increase due to elongation of the chain 105 caused by wear of components of the chain itself. For example, as mentioned in the introductory part of this document, the elongation of the chain 105 may be caused by the consumption of the pins hinging the links 110 when subjected to prolonged strain.

The two Hall sensors 202c and 202d are aligned along the movement direction of the chain 105 (identified in the figure by an arrow), and are separated from each other by a distance Scd. The board 204 comprising the sensors 202c and 202d is located proximate to the forward portion of the closed loop defined by the chain 105 at a distance d (in the direction perpendicular to the plane defined by the chain 105) from the chain 105 itself: the distance d is sufficiently reduced so as to allow each sensor 202c. 202d to detect the presence of the magnetic field generated by the magnet 130 at the time in which the magnet is located above the sensor. Similar considerations may apply when the sensors 202c and 202d are positioned in different ways, for example in the vicinity of the return portion of the closed loop defined by the chain 105.

In accordance with an embodiment of the present invention, each sensor 202c, 202d is configured to provide a respective detection electrical signal Rc, Rd depending on the intensity of the detected magnetic field. For example, each sensor 202c, 202d is a threshold Hall sensor with hysteresis. When no magnet is located in the vicinity of the detector, the intensity of the detected magnetic field is negligible, and the detection signal is set by the sensor device at a low logic value; as the magnet approaches, the intensity of the detected magnetic field increases, rising until it reaches a maximum value when the magnet is located at the position which is the closest to the sensor. The sensor is configured to switch the detection signal to a high logic value as soon as the intensity of the detected magnetic field exceeds a first predefined threshold. The detection signal is maintained at the high logic value by the sensor as long as the intensity of the detected magnetic field is above a second predefined threshold (for example, equal to the first threshold); as soon as the intensity of the detected magnetic field falls below this second threshold, the sensor switches back the detection signal to the low logic value. Consequently, in accordance with an embodiment of the present invention, in order to detect the passage of a magnet over a sensor is sufficient to detect a rising edge of the corresponding detection signal. The board 204 further comprises a counting unit 210 coupled to the sensors 202c and 202d for receiving the detection signals Rc, Rd and performing corresponding measurements of the times employed by the magnet 130 to travel predefined path stretches, as will be described in detail hereinafter.

In accordance with an embodiment of the present invention, in order to evaluate the elongation of the chain 105, the counting unit 210 is configured to perform the measurement of two time intervals using a counter C based on a periodic counting signal having a frequency fc, for example 20 kHz.

Initially, the counter C is initialized to zero. When the sensor 202c detects the passage of the magnet 130 (i.e., at the detection of a rising edge of the detection signal Rc), the counting unit 210 starts a count, beginning to increment the counter C. The count is marked by the count signal, that is, the counter C is incremented by one each time a time interval equal to 1/fc expires. When the passage of the magnet 130 is detected by the sensor 202d (i.e., at the detection of a rising edge of the detection signal Rd), the value C1 assumed by the counter C at the time of the passage is stored by the counting unit 210, for example in a working memory within the counting unit 210 itself. When the sensor 202c detects a subsequent passage of the magnet 130 (i.e., at the detection of a next rising edge of the detection signal Rc) the value C2 assumed by the counter C at that moment is also memorized by the counting unit 210. The counter C is then immediately initialized to zero and the count is immediately restarted.

In accordance with an embodiment of the present invention, the counting unit 210 is configured to store a record of the values C1 and C2 of the counter C obtained at the end of the counts, and perform statistical operations on these record in order to reduce possible detection errors, as will be described later in the present description. In particular, defining with $C1(i)$ the value assumed by the counter C at the passage of the magnet 130 detected by the sensor 202d at the generic i-th count, and with $C2(i)$ the value assumed by the counter C at the next step of the magnet 130 detected by the sensor 202c at the same i-th count, in accordance with an embodiment of the present invention, the counting unit is configured to keep in memory the values $C1(i)$ $C2(i)$ (i=1, 2, ..., p) of the last p counts. The value C (i) is proportional to the time taken by the magnet 130 to travel along a path stretch of length equal to Scd—i.e., from the sensor 202c to the sensor 202d-during the i-th count, while the value $C2(i)$ is proportional to the time taken by the magnet 130 at the i-th count to travel the distance S corresponding to a complete revolution of the chain circuit.

Consequently, by defining with V(i) the speed (covered space Scd divided by taken time) with which the chain 105 moves during the i-th count, the following equation may be obtained:

$$V(i) = \frac{Scd}{(C1(i)) \cdot \left(\frac{1}{fc}\right)}; \quad (1)$$

It has to be noted that in the denominator of the above equation. C1(*i*) has been multiplied by the inverse of the frequency fc in order to obtain an actual time.

Since the distance Scd between the sensors 202*c* and 202*d* is constant over time, in accordance with equation (1) it is possible to monitor the speed of the chain by deducing the value V(i) through the value C1(*i*) calculated by the counting unit 210. Once the value V(i) of the speed is obtained, the length of the chain 105, equal to the value S(i) of the distance S traveled by the magnet 130 to perform a complete revolution of the chain circuit at the i-th count, may be obtained using the following equation:

$$S(i) = V(i) \cdot (C2(i)) \cdot \left(\frac{1}{fc}\right). \quad (2)$$

It has to be noted that even in this case in the denominator of the previous equation, C2(*i*) has been multiplied by the inverse of the frequency fc in order to obtain an actual time.

Considering a number p of counts corresponding to a time interval during which a change in length of the chain due to wear may be reasonably considered null (for example, the value of p may be chosen so as to include all the counts made by the counting unit in a day), it is possible to calculate a mean value S of the distance S with the following formula:

$$S = \frac{\sum_{i=1}^{p} S(i)}{p}. \quad (3)$$

The distance S tends to increase over time from a known initial value because of the elongation of the chain 105 produced by the wear of components of the chain itself. By observing the evolution in time of the values assumed by S is then possible to efficiently monitor the total elongation of the chain 105. In particular, by defining with S(t0) the initial value of the distance S measured at a time t0 (for example, the first time that a new chain 105 has been installed) by equation (3), and with S(t1) the value of the distance S obtainable by the equation (3) at a later time t1, the elongation E1 (in percentage) the chain 105 is subjected during the time between t0 and t1 is equal to:

$$El = \frac{S(t1)}{S(t0)} - 1. \quad (4)$$

A possible configuration suitable for being used with a conveyor belt whose chain 105 moves at a speed of approximately 4 kilometers per hour, and whose links 110 have a length (along the direction of the movement) equal to about 10 cm may for example provide that sensors 202*c* and 202*d* are located on the board 204 at a distance Scd equal to about 300 millimeters.

Figure 3:
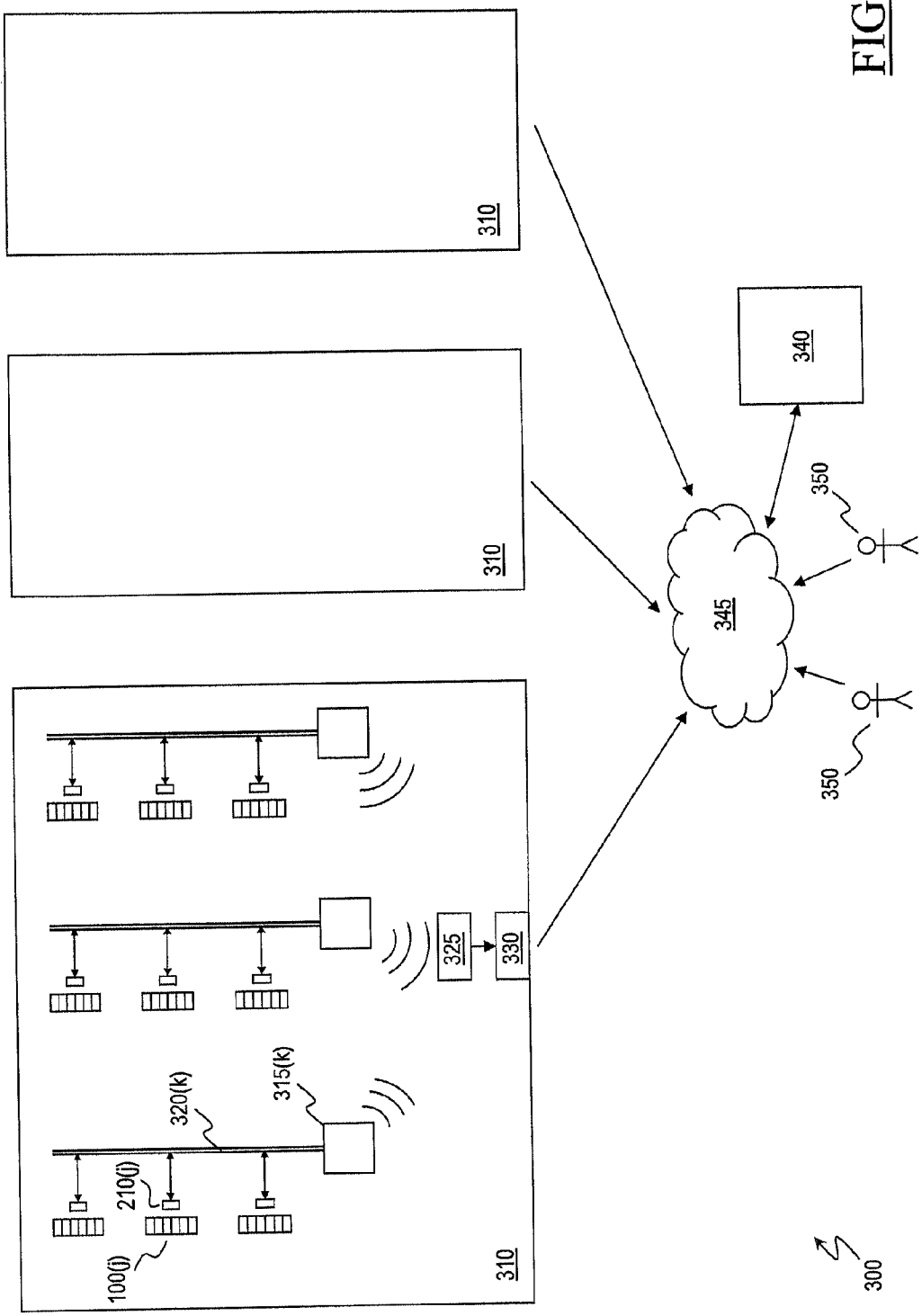

Turning now to FIG. 3, it is schematically shown a monitoring system 300 in accordance with an embodiment of the present invention. With the reference numeral 310 there are indicated generic plants (referred to as user plants) that make use of chain conveyors; for example, each user plant 310 may be an industrial plant or a luggage transport plant of an airport.

Each user system 310 includes a plurality of conveyors 100 (*j*) (j=1, 2, . . . ), each one provided with the detection apparatus of FIG. 2 and comprising a respective counting unit 210 (*j*), and a plurality of interfacing units 315(*k*) (k=1, 2 . . . . ), in the following of the description referred to as "concentrators", for the collection of the count data generated by the counting unit 210(*j*).

Specifically, within each user system 310, each concentrator 315(*k*) is coupled to the detection apparatuses of a respective group of conveyors 100(*j*) by means of a respective fieldbus 320(*k*) (for example, according to the serial connection specification RS-485) connected to the respective counting units 210(*j*) of the conveyors 100(*i*) of the group.

Each user system 310 further comprises a router (gateway) 325 adapted to communicate—for example, through a wireless channel using the allowed radio frequency band (according to the regulations in force in the different countries)—with various concentrators 315(*k*) for receiving the data collected by the detection apparatuses associated with the conveyors 100(*j*) (the values C1(*i*) and C2(*i*)), and send them to a modem 330, for the transmission toward a remote processing unit 340 through an external network 345, such as a MAN, a WAN, a VPN, the Internet, or a telephone network. By processing the received data (C1(*i*) and C2(*i*)), the processing unit 340 calculates the actual elongations the chain of the conveyors 100(*j*) have been subjected to by equation (4).

Through an appropriate software application, such as for example a web service based application, an operator 350 may connect himself/herself to the processing unit 340 and obtain information relating to the effective elongation the chain of a specific conveyor 100(*j*) is subjected to.

In accordance with an embodiment of the present invention, each concentrator 315(*k*) and the counting units 210(*j*) of the respective group of conveyors 100(*j*) are arranged according to a master-slave architecture, where the concentrator 315(*k*) (master) checks and manages the operation of the counting units 210(*j*) of the detection apparatuses (slaves). In this way, the counting units 210(*j*) localized in the conveyors 100(*j*) are exempted from having to perform too complex operations, and therefore the required computing power, proportional to the power consumption, may be maintained at a low levels. Specifically, each counting unit 210(*j*) have to be capable of performing the calculations on the basis of the signals received from the sensors, storing the results of the last p counts, and calculating C1(*i*) and C2(*i*) to be sent to the concentrator 315(*k*).

In order to enable the processing unit 340 to recognize the origin of the received data, each concentrator 315(*k*) is identified by a respective concentrator identification code IDC(k); in the same way, each counting unit 210(*j*) associated with a conveyor 100(*j*) is identified by a respective unit identification code IDU(j).

In accordance with an embodiment of the present invention, the processing unit 340 and the concentrators 315(*k*) are arranged according to a master-slave architecture, wherein the processing unit 340 (master) is configured to interrogate the concentrators 315(*k*) (slave) in order to receive the data collected by the latter. In particular, when the processing unit 340 interrogates a specific concentrator 315(*k*), it responds by sending to the processing unit 340 the acquired data, together with its own concentrator identification code IDC (k).

The processing unit 340, having received the data necessary for calculating the elongation of the conveyors chains, updates a suitably structured data base.

When an operator 350 connects to the processing unit 340 to have information regarding the state of a specific conveyor 110(j), for example by providing the corresponding unit identification code IDU(j), the processing unit 340 responds by outputting the calculated elongation value E1. In this way, the operator 350 may assess whether it is necessary or not the replacement/repair of the chain 105. In accordance with an embodiment of the present invention, the processing unit 340 may also autonomously report the operator 350 when the elongation E1 has exceeded a predetermined critical threshold (for example 3%).

In conclusion, the monitoring system described in accordance with the invention provides for a detection of physical quantities (time periods, calculated by means of counts) carried out locally to the conveyor, the collection of such detected quantities in a concentrator adapted to manage the detection operations, and an actual calculation of the chain elongation carried out by a remote processing unit. Having subdivided the operations to be performed in a distributed system, it is possible to get accurate and reliable results without having to be forced to use overly complicated, delicate and/or expensive devices.

Naturally, in order to satisfy contingent and specific requirements, a person skilled in the art may apply to the solution described above many modifications and alterations.

For example, although in the present description reference is made to a detection apparatus comprising a pair of Hall sensors adapted to detect the presence of a magnet located in a link of the chain, the concepts of the present invention may be applied to a different detecting apparatus, in which the proximity sensors and/or the reference element are of different types. In particular, the concepts of the present invention may be applied to a detection apparatus comprising a pair of any sensors capable of detecting a physical quantity, and a reference element capable of generating anomalies in the surrounding space such as to alter the value of the physical quantity detectable by the sensors. For example, the proximity sensors may be capacitive sensors able to detect electrical capacity variations (with the reference element made of conductive material), inductive sensors able to detect variations in reluctance (with the reference element made of ferromagnetic material), optical sensors capable of detecting the reflection of a light beam (with the reference element realized with suitable opaque and/or reflective materials), or ultrasonic sensors able to detect acoustic return echoes (with the reference element shaped according to an appropriate form).

Although in the described embodiment the calculation of speed and elongation involves using measurements calculated by the counting unit taking into account the last p values of the counter C which have been collected and stored, the concepts of the present invention may be applied in case the speed and/or the elongation are calculated taking into account each time only the last value C1 and/or the last value C2 of the counter, thereby obtaining an instant measurement, performed in real time.

In accordance with an embodiment of the present invention, by directly evaluating the distance S traveled by the magnet to perform a complete revolution of the chain circuit by means of the last value C1 and/or the last value C2 of the counter, it is possible to obtain the actual length of the transport chain in real time. In this case, the operations for the calculation of the length might also be executed by the counting unit.

Although in the described embodiment the speed and the length of the chain have been calculated by performing counts using a single counter which is reset and restarted every time the magnet 130 is detected by the sensor 202c, similar considerations apply in case in which the monitoring system uses two different counters, comprising a first counter configured to be started every time the magnet 130 is detected by the sensor 202c and a second counter configured to be started every time the magnet 130 is detected by the sensor 202d. With this implementation, the calculation of the length of the chain may be performed either by measuring the time elapsed between two consecutive passages of the magnet at the sensor 202c or by measuring the time elapsed between two consecutive passages of the magnet at the sensor 202d.

The invention claimed is:

1. A monitoring system for a conveyor of articles, said conveyor of articles including a static portion and at least one respective endless transport chain movable with respect to the static portion when the conveyor of articles is in operation, said system including:
a reference element located on the transport chain;
a first sensor fixed relative to the static portion and a second sensor fixed relative to the static portion, said first and second sensors being separated from each other by a first distance, each sensor being configured to sense passage of the reference element close to the sensor during the operation of the conveyor;
a counting unit coupled with the sensors and configured to measure a) a first measured time corresponding to time elapsed between a first passage of the reference element close to the first sensor and a first passage of the reference element close to the second sensor, and b) a second measured time corresponding to time elapsed between the first passage of the reference element close to the first sensor and a second passage of the reference element close to the first sensor, or to time elapsed between the first passage of the reference element close to the second sensor and a second passage of the reference element close to the second sensor, said second passage being subsequent to the first passage; and
a computing unit c) determining the transport chain movement speed with respect to the static portion based on the first measured time and the first distance, and d) determining the length of the chain based on the determined movement speed and the second measured time.

2. The system of claim 1, wherein the transport chain includes a plurality of chain links, said reference element being a single reference element located on a chain element.

3. The system according to claim 1, wherein said counting unit is further configured record a first group of first measured times, said first group comprising a series of first measured times most recently measured by said counting unit, said computing unit further comprising a processing unit configured to determine for each first measured time of the first group a corresponding value of the transport chain movement speed by dividing the first distance by said first measured time.

4. The system according to claim 3, wherein said counting unit is further configured to record a second group of second measured times, said second group including a series of second measured times most recently measured by said counting means, said processing unit being further configured for determining for each second measured time of the second group a corresponding value of chain length by multiplying said second measured time with a corresponding determined value of the transport chain movement speed.

5. The system according to claim 4, wherein the processing unit is further configured to determine a chain length average value by summing to each other the values of the transport chain movement speed determined based on the second measured times of the second group and by dividing such sum by the number of second measured times of the second group.

6. The system according to claim 1, wherein said computing unit is configured to determine a transport chain movement speed instantaneous value by dividing the first distance by the first measured time, and a transport chain length instantaneous value by multiplying said instantaneous transport chain movement speed value by the second measured time.

7. The system according to any one among claim 3, wherein the computing unit is remote with respect to the counting unit, said system further including an interfacing unit in communication relationship with the counting unit and the computing unit.

8. The system of claim 7, wherein:
   e) the interfacing unit is adapted to interrogate the counting unit for receiving the first measured times and the second measured times calculated by the counting unit, and f) the computing unit is adapted to interrogate said interfacing unit for receiving the first measured times and the second measured times received from the interfacing unit.

9. The system according to claim 1, wherein g) said sensors are configured to detect a physical quantity, and h) said reference element being configured to generate, in the space surrounding it, anomalies such to altering the value of the physical quantity detectable by the sensors.

10. The system according to claim 9, wherein i) said sensors are Hall sensors, and j) said reference element is a magnet.

* * * * *

UNITED STATES PATENT AND TRADEMARK OFFICE
CERTIFICATE OF CORRECTION

PATENT NO. : 9,139,376 B2  
APPLICATION NO. : 14/375310  
DATED : September 22, 2015  
INVENTOR(S) : Andreoli et al.

Page 1 of 1

It is certified that error appears in the above-identified patent and that said Letters Patent is hereby corrected as shown below:

In the Specification

Column 4, line 37  
"fat" should be --flat--

Column 5, line 23  
"Fall" should be --Hall--

Column 6, line 56  
"C (i)" should be --C1(i)--

Column 8, line 16  
"100(i)" should be --100(j)--

In the Claims

Column 10, line 47  
"configured record" should be --configured to record--

Signed and Sealed this  
Twenty-second Day of March, 2016

Michelle K. Lee  
*Director of the United States Patent and Trademark Office*